United States Patent Office 3,832,315
Patented Aug. 27, 1974

3,832,315
LIGHT SCATTERING POLYMERIC MASSES
Frederick J. Bueche, Dayton, Ohio, assignor to The National Cash Register Company, Dayton, Ohio
No Drawing. Filed Feb. 1, 1971, Ser. No. 111,735
Int. Cl. C08f 45/52
U.S. Cl. 260—28.5 R                                   10 Claims

ABSTRACT OF THE DISCLOSURE

Mixtures of a paraffin such as docosane in a polymer such as ethyl methacrylate are produced by admixing the paraffin in a monomer of the polymer and then polymerizing the monomer by conventional polymerization techniques. The result is an intimate mixture of microscopic domains of the paraffin in the polymer. The paraffin polymer mixtures have a wide variety of uses, e.g., they can be employed as the image portion (screen) of conventional display devices.

---

This invention relates to a process for the production of paraffin-polymer pairs, to the products thereby produced and to display devices.

The two materials of this invention have been selected to exhibit apparent mutual immiscibility and yield a hazy, translucent or opalescent body over a certain temperature range which contains an intimate mixture of microscopic domains of the paraffin in the polymer. While the paraffin-polymer pairs are hereinafter referred to as a body, film or sheet, it should be understood that these terms are employed for the convenience of verbal description only and should not be construed to limit the invention unduly. The physical properties of the body vary widely with temperature depending on the melting point of the paraffin, i.e., depending on whether or not the paraffin is in a crystalline or molten state. It is preferred that the paraffin be crystalline for screens, i.e., just above the use temperature. Below the melting point of the wax the body is highly translucent, due to the presence of dispersed crystalline paraffin particles in the polymer. At or above the melting point of the paraffin, the body becomes optically clear. It is believed that the wax melts to form a liquid when then dissolves in the polymer.

Various processes for the production of translucent polymeric material and the resulting products are known in the art. For example, see U.S. Pat. 2,320,924 which discloses translucent sheets of polymers of styrene and methyl methacrylate. Other prior art includes United States Patent Application Ser. No. 836,021, filed June 24, 1969, in the name of Antoinette M. Purcell, Curt Thies, Morris I. Bank and James W. Leffingwell and assigned to the assignee herein. In some of these prior art materials, the amount of polymer determines the degree of translucency, while in other materials the degree of translucency depends upon the employment of a solvent.

It now has been found that translucent or transparent bodies can be produced by dissolving a paraffin in a monomer and polymerizing the monomer by conventional methods. The resulting body is a uniform dispersion of microscopic domains of the paraffin in the polymer. The paraffin is essentially completely miscible with the polymer above the crystal-melting point of the paraffin but essentially completely immiscible with the resulting polymer at or just below the melting point of the paraffin.

Accordingly, an object of this invention is to provide a process for the production of mixtures of a paraffin in a polymer.

Another object of this invention is to provide mixtures of paraffin in a polymer.

Still another object of this invention is to provide display devices.

Other objects, aspects and advantages of this invention will be apparent to one skilled in the art from the following disclosure and appended claims.

The paraffins that are employed in this invention are alkanes or saturated aliphatic hydrocarbons. These paraffins can be amino (—NH$_2$), carboxyl (—COOH), or hydroxyl (—OH) substituted in the alpha or beta position. These waxes are represented by the formula

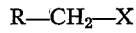

R—CH$_2$—X wherein R is an alkyl radical having 9 to 35 carbon atoms, X is hydrogen or an amino (—NH$_2$), carboxyl (—COOH), or hydroxyl (—OH) radical. Preferably, R is an alkyl radical having 12 to 24 carbon atoms and X is hydrogen. Specific examples of these paraffins are docosane, docosoic acid, docosyl alcohol and docosyl amine. Other examples are decane, decyclic acid, decyl alcohol and decyl amine. For the sake of clarity, other representative paraffins are not being listed as they can be explicitly derived from the above description. Further, representative paraffins can be readily obtained from the *Handbook of Chemistry and Physics*, Forty-Sixth Edition, published by The Chemical Rubber Company, Cleveland, Ohio.

The monomers that are employed in this invention are styrene, butadiene, methyl methacrylate, ethyl methacrylate, butyl methacrylate and the like, and mixtures thereof, preferably the methacrylates.

The ratio of paraffin to monomer can vary widely. Generally, a major portion of monomer and a minor portion of paraffin are employed. Preferably, up to 20 weight percent of the paraffin is employed.

The polymerization of this invention can be carried out under conventional polymerization conditions. Generally, the polymerization is carried out at a temperature ranging up to 150 degrees centigrade, at a pressure ranging up to 500 atmospheres and for a time ranging up to 3 days. Preferably, the polymerization is carried out at a temperature ranging from 50 degrees to 130 degrees centigrade, at atmospheric pressure and for a time ranging up to 48 hours. Other polymerization conditions which can be employed in this invention are disclosed in previously mentioned U.S. Pat. 2,320,924. The polymerization can be carried out with or without initiators or cross-linking agents such as ethylene di(methacrylate); however, the polymerization always is carried out in the absence of a conventional solvent. While the paraffin is miscible with the monomer, the paraffin is immiscible with the resulting polymer below the crystal melt temperature of the paraffin.

A film, once prepared from the paraffin-polymer pairs of this invention can be employed in conventional display devices as the imaging portion, i.e., the face or screen. The performance of these screens depends upon the two-phase dispersion of the paraffin in the polymer, i.e., upon the immiscibility of the paraffin in the polymer. Below the melting point of the paraffin, the film is highly translucent due to crystalline properties of the paraffin dispersed in the polymer. The translucency depends upon the light scattering properties of the paraffin. This film is an intimate mixture of microscopic domains of the paraffin in the polymer. Due to the fine dispersion of the paraffin in the polymer, the film exhibits uniform light scattering properties. The paraffin-polymer mixtures of this invention also can be used in any films, coatings or molded products. Specific examples are sky-lights and a wide variety of window panes such as those used in greenhouses. If an optically clear film is required, the temperature of the display device is at or above the melting point of the paraffin. The thickness of the films can vary widely. Generally, the thickness can range up to 1 millimeter, preferably 5 to 15 mils.

The film possesses a grain-free translucent optical property. Generally, the radius of the microscopic domains of the paraffin range from 100 to 500 Angstroms (A.), preferably 200 to 400 A.

The advantages of this invention are further illustrated by the following examples. The reactants and the proportions and other specific conditions are presented as being typical and should not be construed to limit the invention unduly.

EXAMPLE I

The materials employed herein consist of two phases. They were prepared by dissolving 3.3 weight percent docosane in a monomer of ethyl methacrylate. After sealing the materials in a test tube, the monomer was polymerized without an initiator at a temperature of 85 degrees centigrade initially for 24 hours and finished off at increasing temperatures up to 130 degrees centigrade for 24 hours. The phase separation occurs during polymerization at late stages in the process. A minimum concentration of 0.2 weight percent of docosane was exceeded for phase separation to occur.

To use the sample for scattering measurements, the solid body was machined into 1 cm. diameter discs with a thickness of 1 millimeter. Sample surfaces were polished and most of the discs were further smoothed by heating between glass plates. All scattering measurements were made in a modified Brice-Pheonix light scattering instrument 4358 to 5461 A. wavelengths. The discs were mounted freely in the light path of the instrument, which was a beam about 2 millimeters square. After correction for refraction at the disc surface, the minimum scattering angle was considerably less than 5 degrees. The domain radius for docosane in this Example average 340 A.

EXAMPLE II

The materials employed herein consist of two phases. They were prepared by dissolving 10.0 weight percent, of a paraffin in a monomer of butyl methacrylate. Paraffins having 20, 22, 24, 26, 28, 32 and 36 carbon atoms were employed. After sealing the pairs of materials in test tubes, the monomers were polymerized without an initiator at a temperature of 90 degrees centigrade initially for approximately 15 hours. Although no initiator was employed, the resulting samples were rinsed with 10 percent sodium hydroxide-water solution, followed by water to remove any free radical inhibitor present. All but the $C_{36}$ mass remained clear through the polymerization process. The $C_{36}$ sample was opalescent.

To use the samples for light scattering measurements, differential scanning calorimetric measurements, thermomechanical analysis and dielectric relaxation measurements, the resulting solid masses were pressed between polished aluminum plates, heated to about 150 degrees centigrade and quenched in cold water. The resulting sheet had a thickness of about 20 mils.

EXAMPLE III

The sheets of Example II were subjected to thermal treatment as in a differential scanning calorimeter. It was found that the sheets undergo a transformation from a white opalescent state to a visually clear state when the temperature of the sheet rises above the crystalline melting point of the incorporated paraffin. Upon cooling, the sheet returns to the opalescent state when the temperature of the sheet drops below the crystalline melting point of the incorporated paraffin. This process is reversible and can be repeated many times. However, the temperature of recrystallization often occurs 10 degrees to 30 degrees centigrade below the paraffin's melting temperature due to the molten paraffin's tendency to supercool before recrystallizing. The melting and crystallization process can be readily followed by differential scanning calorimetric measurements, dielectric relaxation measurement, or thermal mechanical analysis.

EXAMPLE IV

Samples of the sheets prepared in Example II were employed as viewing screens for rear view projectors. The compositions of the sheets were as follows: 1 gram of paraffin and 5 mililiters of butyl methacrylate; 1 gram of paraffin and 10 milliliters of butyl methacrylate; and 1 gram of paraffin and 20 milliliters of butyl methacrylate. $C_{24}$ and $C_{36}$ paraffins were employed in each sample. The light scattering of the sheets was determined with a device having a 550 m$\mu$ light source, a photocell detector and a sample holder. The relative light intensity transmitted through the sheet then was measured as a function of the viewing angle. All measurements were taken below the melting point of the paraffin. The results demonstrated that scattering was dependent upon the weight percent of paraffin present. Higher paraffin content resulted in light scattering being less dependent upon the viewing angle. Sheet thickness of the C sheet was varied from 5 to 15 mils and it was observed that less angle dependence occured as film thickness increased. However, all the sheets employed were visually grain free, thereby indicating small scattering centers of the paraffin throughout the polymer.

EXAMPLE V

The sheets prepared in Example II and subjected to thermal treatment as in Example III can be used for writing or printing purposes. A source of energy such as a print head, electron beam or laser ray can cause a selected area of the sheet to become clear upon heating. The writing or printing is normally the clear area; however, the opposite effect can be had by heating the background instead of the writing. This thermally treated material can be used to form a projection device as the heated area of the sheet allows the passage of light, while the cooler area scatters light readily.

Although this invention has been described in considerable detail, it must be understood that such detail is for the purpose of illustration only and that many variations and modifications can be made by one skilled in the art without departing from the scope and spirit thereof.

What is claimed is:

1. A process for producing an intimate mixture of microscopic domains of a paraffin in a polymer which comprises the steps of (a) dissolving a paraffin represented by the formula

R—CH$_2$—X wherein R is an alkyl radical having 9 to 35 carbon atoms and X is hydrogen or an amino, carboxyl or hydroxyl radical in a monomer of styrene, butadiene, methyl methacrylate, ethyl methacrylate, butyl methacrylate or mixtures thereof, and (b) subjecting the resulting solution to polymerization conditions until polymerization of the monomer is complete.

2. A process according to claim 1 wherein a minor portion of the paraffin and a major portion of the monomer are employed, based on the total weight of the mixture.

3. A process according to claim 1 wherein the paraffin comprises up to 20 weight percent of the mixture.

4. A process according to claim 1 wherein R is an an alkyl radical having 12 to 24 carbon atoms, X is hydrogen and the monomer is methyl methacrylate, ethyl methacrylate, ethyl methacrylate or butyl methacrylate.

5. A process according to claim 1 wherein the paraffin is docosane, the monomer is ethtyl methacryalte and docosane comprises 3.3 weight percent of the mixture.

6. An intimate mixture of microscopic domains of a minor portion of a paraffin represented by the formula

R—CH$_2$—X wherein R is an alkyl radical having 9 to 35 carbon atoms and X is hydrogen or an amino, carboxyl or hydroxyl radical in a major portion of a polymer of poly(styrene), poly(butadiene), poly(methyl methacrylate), poly(ethyl methacrylate), poly(butyl methacrylate) or copolymers thereof, wherein the radius of the domains of the paraffin range from 100 to 500 A.

7. A mixture according to claim 6 wherein R is an alkyl radical having 12 to 24 carbon atoms, X is hydrogen and the polymer is poly(methyl methacrylate), poly(ethyl methacrylate) or poly(butyl methacrylate).

8. A mixture according to claim 6 wherein the radius of the domains of the paraffin ranges from 200 to 400 A.

9. A mixture according to claim 6 wherein the paraffin comprises up to 20 weight percent of the mixture.

10. A mixture according to claim 6 wherein the paraffin is docosane, the polymer is poly(ethyl methacrylate), the average radius of the domains of the wax is 340 A., and the paraffin comprises 3.3 weight percent of the mixture.

References Cited
UNITED STATES PATENTS

| | | | |
|---|---|---|---|
| 2,320,924 | 5/1939 | Gift | 260—885 |
| 3,324,074 | 6/1967 | McManimie | 260—41 |
| 3,412,059 | 11/1968 | Stickelmeyer et al. | 260—28.5 |

MORRIS LIEBMAN, Primary Examiner

S. L. FOX, Assistant Examiner

U.S. Cl. X.R.

260—28.5 A, 28.5 B